United States Patent
Harmon et al.

(10) Patent No.: US 12,103,495 B2
(45) Date of Patent: Oct. 1, 2024

(54) FRONT TRUNK INCLUDING FEATURES FOR WORK AND ENTERTAINMENT PURPOSES

(71) Applicant: Ford Global Technologies, LLC, Dearborn, MI (US)

(72) Inventors: Michael John Harmon, Northville, MI (US); Erol Ozcelik, Old Bridge, NJ (US); Hussain Z. Tajmahal, Detroit, MI (US); Benjamin Howard, Grosse Pointe Park, MI (US); Kathryn N. Cezar, Berkley, MI (US); Leyna Hirsch, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 121 days.

(21) Appl. No.: 17/892,227

(22) Filed: Aug. 22, 2022

(65) Prior Publication Data
US 2023/0391267 A1    Dec. 7, 2023

Related U.S. Application Data

(60) Provisional application No. 63/347,704, filed on Jun. 1, 2022.

(51) Int. Cl.
| | |
|---|---|
| *B60R 5/02* | (2006.01) |
| *B60N 3/00* | (2006.01) |
| *B60N 3/10* | (2006.01) |
| *B60R 11/02* | (2006.01) |
| *B60R 16/03* | (2006.01) |
| *B60R 19/52* | (2006.01) |
| *B60R 11/00* | (2006.01) |

(52) U.S. Cl.
CPC ............. *B60R 5/02* (2013.01); *B60N 3/001* (2013.01); *B60N 3/10* (2013.01); *B60R 11/0229* (2013.01);
(Continued)

(58) Field of Classification Search
CPC ......... B60R 5/02; B60R 5/04; B60R 11/0229; B60R 11/0235; B60R 2011/0036; B60R 2011/004; B62D 25/087; B62D 25/105
(Continued)

(56) References Cited

U.S. PATENT DOCUMENTS

| | | |
|---|---|---|
| 4,455,948 A | 6/1984 | Torres |
| 5,685,468 A | 11/1997 | Hernandez et al. |

(Continued)

FOREIGN PATENT DOCUMENTS

KR    20220056378 A    *    5/2022

OTHER PUBLICATIONS

English translation of KR 20220056378; retrieved via Patent-Translate located at www.epo.org. (Year: 2023).*

(Continued)

*Primary Examiner* — Jason S Daniels
(74) *Attorney, Agent, or Firm* — Vichit Chea; Carlson, Gaskey & Olds, P.C.

(57) ABSTRACT

This disclosure relates to a front trunk including a number of features, which can be used for work purposes, entertainment purposes, or both. In some aspects, the techniques described herein relate to a motor vehicle, including: a front trunk establishing a cargo space; a first panel moveable between a closed position in which the first panel covers the front trunk and an open position in which the first panel uncovers the front trunk, wherein the first panel includes a first surface facing the cargo space when the first panel is in the closed position; and an electronic visual display mounted to the first surface, wherein the first panel and the electronic visual display are configured such the electronic visual display is substantially perpendicular a ground surface beneath the motor vehicle when the first panel is in the open position.

17 Claims, 4 Drawing Sheets

(52) U.S. Cl.
CPC .............. *B60R 16/03* (2013.01); *B60R 19/52* (2013.01); *B60R 2011/0036* (2013.01)

(58) Field of Classification Search
USPC .................................... 296/24.45, 37.5, 37.6
See application file for complete search history.

(56) References Cited

U.S. PATENT DOCUMENTS

| | | | | |
|---|---|---|---|---|
| 7,444,773 | B2* | 11/2008 | Kolodziejczak, Sr. | ...................... G09F 21/043 40/607.14 |
| 10,717,471 | B2* | 7/2020 | Glickman | ................ B60Q 3/30 |
| 10,926,705 | B2 | 2/2021 | Hoffman et al. | |
| 10,931,910 | B2* | 2/2021 | Bottomly | .............. G09F 21/048 |
| 10,941,593 | B2 | 3/2021 | Krishnan et al. | |
| 11,142,129 | B2 | 10/2021 | Howard, II et al. | |
| 11,713,004 | B2* | 8/2023 | Hockly | ...................... G09F 9/30 40/594 |
| 2009/0101422 | A1 | 4/2009 | Subramanian | |
| 2020/0301257 | A1* | 9/2020 | Genovese | ............ G03B 17/561 |

OTHER PUBLICATIONS

Halvorson, B. (Nov. 16, 2021). 2022 Ford F-150 Lightning Electric Truck's frunk is more than the space left over. Green Car Reports. Retrieved Aug. 17, 2022, from https://www.greencarreports.com/news/1134181_2022-ford-f-150-lightning-electric-truck-frunk-more-than-the-space-left-over.

* cited by examiner

FRONT TRUNK INCLUDING FEATURES FOR WORK AND ENTERTAINMENT PURPOSES

RELATED APPLICATION(S)

This application claims the benefit of U.S. Provisional Application No. 63/347,704, filed Jun. 1, 2022, the entirety of which is herein incorporated by reference.

TECHNICAL FIELD

This disclosure relates to a front trunk including a number of features, which can be used for work purposes, entertainment purposes, or both.

BACKGROUND

Electrified vehicles are being developed to either reduce or completely eliminate the reliance on internal combustion engines. With the onset of electrified vehicles, many existing components in the vehicle engine compartment may become unnecessary. The space made available by the removal of these components makes room for a front trunk, which is a storage compartment located near the front of the vehicle, and which is commonly referred to using the portmanteau "frunk."

SUMMARY

In some aspects, the techniques described herein relate to a motor vehicle, including: a front trunk establishing a cargo space; a first panel moveable between a closed position in which the first panel covers the front trunk and an open position in which the first panel uncovers the front trunk, wherein the first panel includes a first surface facing the cargo space when the first panel is in the closed position; and an electronic visual display mounted to the first surface, wherein the first panel and the electronic visual display are configured such the electronic visual display is substantially perpendicular a ground surface beneath the motor vehicle when the first panel is in the open position.

In some aspects, the techniques described herein relate to a motor vehicle, further including: a mount attached to or integrally formed with the first surface.

In some aspects, the techniques described herein relate to a motor vehicle, wherein the mount includes perforated hardboard.

In some aspects, the techniques described herein relate to a motor vehicle, wherein: the electronic visual display is rigidly attached to the first surface via the mount.

In some aspects, the techniques described herein relate to a motor vehicle, wherein: the first surface is inclined at an acute angle relative to the ground surface when the first panel is in the open position, and the electronic visual display is attached to the first surface via the mount such that the electronic visual display is rotatable relative to the first surface to a position in which the electronic visual display is substantially perpendicular to the ground surface.

In some aspects, the techniques described herein relate to a motor vehicle, further including: a shelf configured to slide between a deployed position and a retracted position, wherein, in a retracted position, a front edge of the shelf is substantially flush with a rear wall adjacent a top of the cargo space, and, in the deployed position, a front edge of the shelf is forward of the rear wall and rearward of a front of the cargo space.

In some aspects, the techniques described herein relate to a motor vehicle, wherein, above the shelf, the rear wall includes a plurality of power outlets.

In some aspects, the techniques described herein relate to a motor vehicle, wherein, below the shelf, the rear wall includes perforated hardboard.

In some aspects, the techniques described herein relate to a motor vehicle, further including: first and second ledges on opposite sides of the cargo space, wherein the first and second ledges each include a work surface substantially parallel to a floor of the cargo space.

In some aspects, the techniques described herein relate to a motor vehicle, wherein the first and second ledges each include at least one cup holder adjacent the work surface.

In some aspects, the techniques described herein relate to a motor vehicle, further including: a second panel moveable independent of the first panel between a closed position in which the second panel covers the front trunk and an open position in which the second panel uncovers the front trunk.

In some aspects, the techniques described herein relate to a motor vehicle, wherein the second panel is rotatable about an axis adjacent a bottom edge of the second panel.

In some aspects, the techniques described herein relate to a motor vehicle, wherein the second panel includes power outlets in an edge thereof such that the power outlets face a forward direction when the second panel is in the open position.

In some aspects, the techniques described herein relate to a motor vehicle, wherein the second panel is configured to slide forward and downward when moving from the closed position to the open position.

In some aspects, the techniques described herein relate to a motor vehicle, further including: a floor moveable to a position at least partially forward of a front bumper of the motor vehicle when the second panel is in the open position.

In some aspects, the techniques described herein relate to a motor vehicle, wherein the first panel is a hood of the motor vehicle and the second panel is a grille of the motor vehicle.

In some aspects, the techniques described herein relate to a method, including: moving a first panel to an open position such that an electronic visual display mounted to the first panel is substantially perpendicular to a ground surface, wherein the first panel is configured to selectively cover and uncover a front trunk of a motor vehicle.

In some aspects, the techniques described herein relate to a method, wherein the electronic visual display is rigidly mounted to an underside of the first panel.

In some aspects, the techniques described herein relate to a method, wherein the electronic visual display is rotatable relative to the first panel.

In some aspects, the techniques described herein relate to a method, further including: moving a second panel independent of the first panel, wherein the second panel is configured to selectively cover and uncover the front trunk.

DETAILED DESCRIPTION

This disclosure relates to a front trunk including a number of features, which can be used for work purposes, entertainment purposes, or both. Among other benefits, which will be appreciated from the below description, the disclosed features increase the usability of the front trunk, and, in turn, the vehicle overall. In particular, many of the features discussed below are intended to make the front trunk more usable at worksites, tailgating events, etc.

Figure 1:
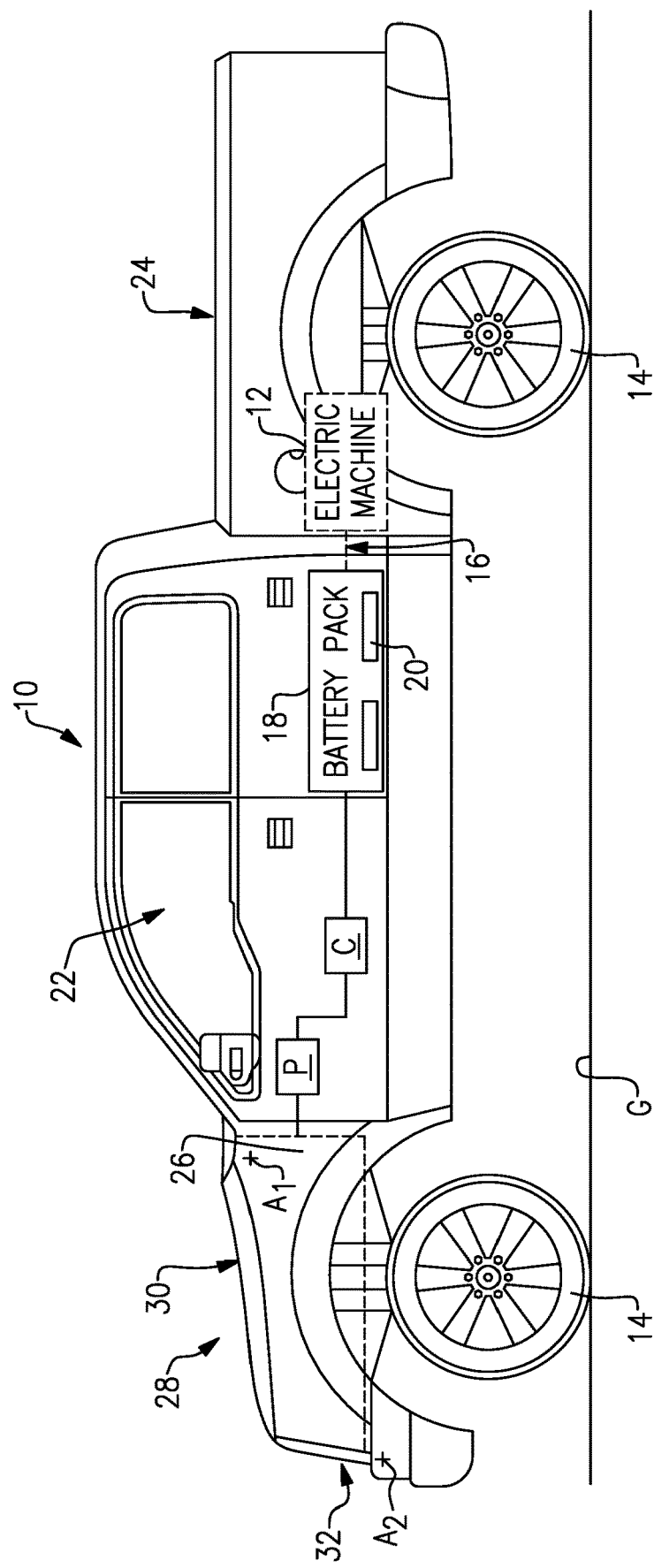
FIG. 1 schematically illustrates an electrified vehicle.

FIG. 1 schematically illustrates a motor vehicle, which here is an electrified vehicle 10 ("vehicle 10"). The vehicle 10 may include any type of electrified powertrain. In an embodiment, the vehicle 10 is a battery electric vehicle (BEV). However, the concepts described herein are not limited to BEVs and could extend to other electrified vehicles, including, but not limited to, plug-in hybrid electric vehicles (PHEVs), fuel cell vehicles, etc. Therefore, although not specifically shown in this embodiment, the vehicle 10 could be equipped with an internal combustion engine that can be employed either alone or in combination with other energy sources to propel the vehicle 10. In particular, certain aspects of this disclosure could apply to vehicles other than electrified vehicles that include front trunks, such as mid-engined or rear-engined vehicles.

In the illustrated embodiment, the vehicle 10 is a full electric vehicle propelled solely through electric power, such as by one or more electric machines 12, without any assistance from an internal combustion engine. The electric machine 12 may operate as an electric motor, an electric generator, or both. The electric machine 12 receives electrical power and provides a rotational output torque to one or more drive wheels 14, such as through a transmission gearbox (not shown).

A voltage bus 16 electrically connects the electric machine 12 to a battery pack 18. The battery pack 18 is an exemplary electrified vehicle battery. The battery pack 18 may be a high voltage traction battery pack that includes one or more battery arrays 20 (i.e., groupings of rechargeable battery cells) capable of outputting electrical power to operate the electric machine 12 and/or other electrical loads of the vehicle 10. Other types of energy storage devices and/or output devices can also be used to electrically power the vehicle 10.

In the illustrated embodiment, the vehicle 10 is a pickup truck. However, the vehicle 10 could also be a car, a van, a sport utility vehicle, or any other type of vehicle.

As shown in FIG. 1, the vehicle 10 includes a passenger cabin 22, a truck bed 24 located to the rear of the passenger cabin 22, and a front trunk 26 located to the front of the passenger cabin 22. The truck bed 24 may establish a first cargo space of the vehicle 10, and the front trunk 26 may establish a second cargo space of the vehicle 10. The front trunk 26 may be referred to using the portmanteau "frunk" or more generally as a front cargo space.

The front trunk 26 may provide an additional cargo space not traditionally available in most conventional internal combustion powered vehicles. This disclosure includes various features that increase the usefulness and usability of the front trunk 26.

The front trunk 26 is selectively covered by a closure assembly 28. In this example, the closure assembly 28 is a split opening and includes two independently moveable panels, namely a first panel 30 and a second panel 32, that are moveable to cover and uncover the front trunk 26. The front trunk 26, then, may be conveniently accessed through either the first panel 30, the second panel 32, or both. In the illustrated example, the first panel 30 is a hood of the vehicle 10, and the second panel 32 is a grille of the vehicle 10. The first panel 30 and the second panel 32 are each independently moveable between a closed position (FIG. 1) and an open position (FIG. 2) to selectively cover and uncover the front trunk 26, respectively. In particular, the first panel 30 is rotatable about a first axis $A_1$ adjacent a rear of the first panel 30 to selectively cover and uncover the front trunk 26 from above. The second panel 32, in this example, is rotatable about a second axis $A_2$ adjacent a bottom of the second panel 32 to selectively cover and uncover the front trunk 26 from the front. The first panel 30 may be referred to as a hood panel, and the second panel 32 may be referred to as a grille panel.

The second panel 32 may be sized and shaped to match a grille in an engine-driven model of a vehicle, such as a pickup truck, in order to maintain the same look and allow for essentially the same front end vehicle body structure across a vehicle lineup. While the second panel 32 may be configured to look the same as engine-driven vehicles, the second panel 32 exhibits solid surfaces configured to keep water out of the front trunk 26. In this example, the solid surfaces are feasible in the vehicle 10 because no air flow is needed for engine cooling.

Figure 2:
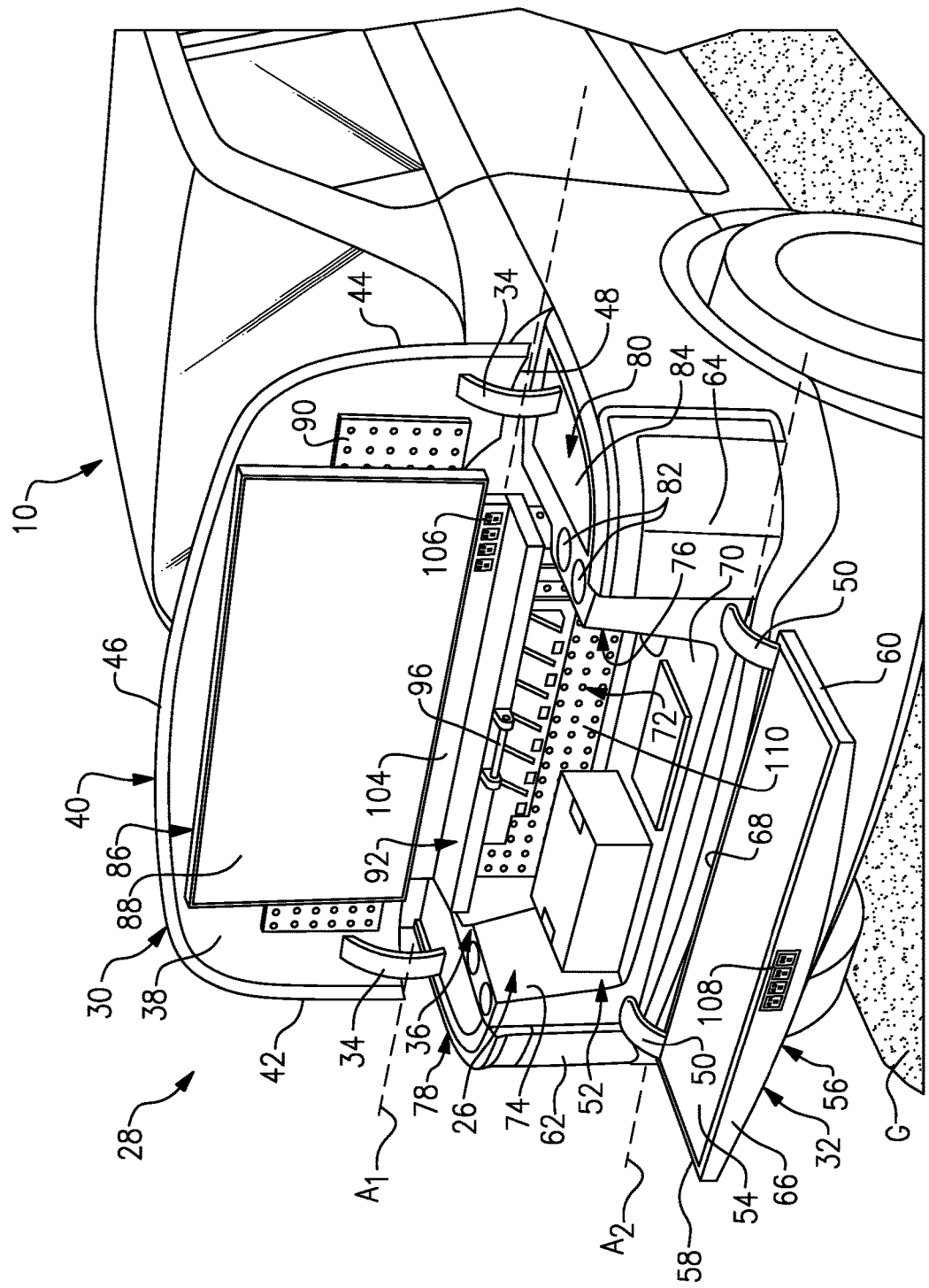
FIG. 2 illustrates a front trunk of the electrified vehicle.

FIG. 2 illustrates the first and second panels 30, 32 in their respective open positions. When moving to their respective open positions, the first and second panels 30, 32 move in generally opposite directions in this example. In particular, with reference to FIG. 2, the first panel 30 has rotated rearwardly and upwardly about axis $A_1$ relative to the closed position of FIG. 1, while the second panel 32 has rotated forwardly and downwardly about axis $A_2$ relative to the closed position of FIG. 1. With both the first and second panels 30, 32 in their respective open positions, the front trunk 26 is accessible from above and from the front. Axes $A_1$, $A_2$ are parallel to one another and perpendicular to a centerline of the vehicle 10 in this example. The locations of the axes $A_1$, $A_2$ are representative. Other locations for the axes $A_1$, $A_2$ come within the scope of this disclosure.

The first panel 30 is rotatable about the axis $A_1$ via a pair of hinges 34 to selectively cover and uncover a top opening 36 of the front trunk 26. The hinges 34 may be provided by strand hinges, in which one of the strands is curved. The hinges 34 may alternatively be provided by another type of hinge, such as a barrel hinge, or a linkage, such as a four bar linkage.

The first panel 30 includes first surface 38 and a second surface 40 opposite the first surface 38. The first surface 38 is the underside of the first panel 30. When the first panel 30 is closed, the first surface 38 faces the front trunk 26. The second surface 40 provides an exterior of the vehicle 10, and in particular provides a top of a hood in this example. When the first panel 30 is open, the first surface 38 may be referred to as a forward surface, and the second surface 40 may be referred to as a rear surface. The first and second surfaces 38, 40 extend laterally between opposed side edges 42, 44, and also extend between edges 46, 48. When the first panel 30 is closed, the edge 46 is a front edge and the edge 48 is a rear edge. When the first panel 30 is open, the edge 46 may be referred to as a top edge and the edge 48 may be referred to as a bottom edge.

The second panel 32 is rotatable about the axis $A_2$ via a pair of hinges 50 to selectively cover and uncover a front opening 52 of the front trunk 26. The hinges 50 may be provided by strand hinges, in which one of the strands is curved. The hinges 50 may alternatively be provided by another type of hinge or linkage.

The second panel 32 includes first surface 54 and a second surface 56 opposite the first surface 54. When the second panel 32 is closed, the first surface 54 faces the front trunk 26. The second surface 56 provides an exterior of the vehicle 10, and in particular provides a grille in this example. When the second panel 32 is open, the first surface 54 may be referred to as a top surface, and the second surface 56 may be referred to as a bottom surface. The first and second surfaces 54, 56 extend laterally between opposed side edges 58, 60, which in this example fit between opposed headlamps 62, 64. The first and second surfaces 54, 56 also extend between edges 66, 68. When the second panel 32 is closed, the edge 66 is a top edge and the edge 68 is a bottom edge. When the second panel 32 is open, the edge 66 may be referred to as a front edge and the edge 68 may be referred to as a rear edge.

When the first and second panels 30, 32 are closed, the edge 66 is configured to fit relative to the first surface 38 to enclose the front trunk 26 and seal the front trunk 26 relative to the outside environment. In particular, the edge 66 abuts the first surface 38 either directly or indirectly via a seal or gasket, as examples. In this embodiment, the first panel 30 does not include a component extending vertically-downward from the first surface 38 adjacent the edge 46. In other words, the first panel 30 does not provide any portion of the grille of the vehicle 10.

The front trunk 26 includes a floor 70, a rear wall 72, and opposed lateral side walls 74, 76, which provide boundaries of a front cargo space of the vehicle 10. Various items, such as a toolbox and tablet, are resting on the floor 70, and various other items such as tools and chargers are attached to the rear wall 72.

Laterally outward of the side walls 74, 76, side ledges 78, 80 are accessible and usable when the first panel 30 is open. The side ledges 78, 80 extend laterally from an upper portion of a respective one of the side walls 74, 76 to an exterior side of the vehicle 10, and otherwise generally exhibit a similar contour to the first panel 30 such that when the first panel 30 is closed, the first panel 30 overlaps and covers the side ledges 78, 80. In an example, the first panel 30 directly abuts the side ledges 78, 80 when the first panel 30 is closed. The side ledges 78, 80 are configured as useable spaces when the first panel 30 is open. With reference to side ledge 80, the side ledge 80 includes two cup holders 82 and a work surface 84. The side ledge 78 is configured similarly, but reflected about the centerline of the vehicle 10. The work surface 84 is substantially parallel to the floor 70 of the front trunk 26. The work surface 84 may be formed as a textured or finished surface configured to resist sliding of items places on the work surface 84. In this regard, the work surface 84 may be considered a storage tray. The work surface 84 could alternatively be configured to receive a rubber mat. The work surface 84 could alternatively or additionally be configured to include or receive a wireless charging pad configured to charge computing devices or mobile devices.

An aspect of this disclosure relates to a presentation of an electronic visual display 86, such as a television or computer monitor, and which can display images and video for the enjoyment of users adjacent the front trunk 26, such as during tailgating or similar activities. In this example, the electronic visual display 86 is mounted to the first surface 38 of the first panel 30. When the first panel 30 is open, as in FIG. 2, the electronic visual display 86 is substantially perpendicular to a ground surface G, and in particular a screen 88 of the electronic visual display 86 is substantially perpendicular to the ground surface G, which increases the ease of viewing the electronic visual display 86. The ground surface G is the surface immediately under the wheels 14 of the vehicle 10, and may be concrete, pavement, grass, dirt, etc. The ground surface G may be uneven. The term "substantially" is used herein to refer to angles that one would consider substantially close to perpendicular given the fact that the vehicle 10 may be on an uneven ground surface G. In this regard, the first panel 30 is configured to rotate substantially 90° between the closed and open positions such that the electronic visual display 86 is substantially perpendicular to the ground surface G when the first panel 30 is open. As another reference point, the screen 88 of the electronic visual display 86 is perpendicular to a plane containing the floor 70, within acceptable tolerances, such as ±3°.

The first surface 38 includes a section including a mount, which in this example is perforated hardboard 90, to facilitate mounting one or more items to the first surface 38. In this example, the electronic visual display 86 is mounted either directly to the perforated hardboard 90 or indirectly to the perforated hardboard 90 via a separate mounting bracket. The perforated hardboard 90 can alternatively or additionally be used for the storage of tools and equipment, as examples. In one example, the perforated hardboard 90 is mounted to the first surface 38. The perforated hardboard 90 includes equally-spaced apart holes configured to receive standard sized pegs, hooks, or other adapters configured to mount and store various items. In another example, the first surface 38 is integrally formed with equally-spaced holes corresponding to those of perforated hardboard.

Once mounted to the first surface 38, the electronic visual display 86 is rigidly attached to the first surface 38, via perforated hardboard 90 and/or another mount, and the electronic visual display 86 is not configured to move relative to the first surface 38, in this embodiment. In this manner, any movement of the electronic visual display 86 is governed by movement of the first surface 38, which in turn is governed by movement of the first panel 30.

Figure 3:
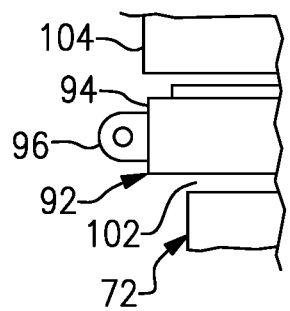
FIG. 3 somewhat schematically illustrates a side view of a shelf in a retracted position.
Figure 4:
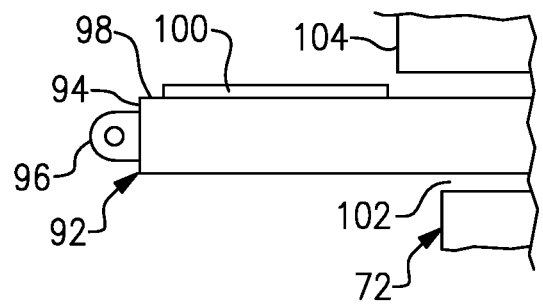
FIG. 4 somewhat schematically illustrates a side view of the shelf in a deployed position.

Another aspect of this disclosure relates to a sliding shelf 92. The shelf 92 is slidable between a deployed position (FIG. 2 and FIG. 4) and a retracted position (FIG. 3). The shelf 92 may slide on sliding tracks similar to drawer slides. The shelf 92 extends substantially an entire width between ledges 78, 80. A front edge 94 of the shelf 92 includes a handle 96 configured to be grasped by a hand of a user such that the user can slide the shelf 92 between the deployed and retracted positions. A top surface 98 includes or is integrally formed with a work surface 100, which can be formed as a textured or finished surface configured to resist sliding of items places on the work surface 100. The work surface 100 could be provided by a rubber mat placed on the top surface 98. The work surface 100 could alternatively or additionally be configured to include or receive a wireless charging pad configured to charge computing devices or mobile devices.

The shelf 92 is slidable relative to the rear wall 72. In this example, the rear wall 72 includes a slot 102 sized and shape to receive the shelf 92 when the shelf 92 is in the retracted position. In the retracted position, the front edge 94 is substantially flush and substantially lies in a common vertical plane with an upper portion 104 of the rear wall 72. The upper portion 104 is vertically above the shelf 92 and includes a plurality of power outlets 106 (FIG. 2) in this example. The power outlets 106 facilitate charging of items, such as computing devices or mobile devices, that may be placed on the shelf 92 when the shelf 92 is deployed.

In this example, the shelf 92 is configured to deploy only partially into the front trunk 26. When deployed, the front edge 94 is forward of the rear wall 72 but rearward of a front of the front trunk 26. In one example, when deployed, the shelf 92 extends a distance from the rear wall 72 that is about 25% of the overall depth of the front trunk 26. As such, the shelf 92 can serve as a useful storage location for various, relatively small, items without significantly impeding access to the front trunk 26.

Regarding the power outlets 106, in this example, four 120 Volt power outlets are shown. However, the upper portion 104 could include a different number or type of power outlets, including 240 Volt power outlets, USB-C outlets, etc.

In addition to power outlets 106, the second panel 32 also includes power outlets 108 in the edge 66, in this example. In this regard, when the second panel 32 is in the open position, the first surface 54 is substantially parallel to the ground surface G and may function as a tabletop or work space and could be used as a desk, a picnic table, a tailgating area, etc. The power outlets 108 can conveniently charge items such as tools, computing devices, or mobile devices that are being used on the first surface 54. As with the power outlets 106, the power outlets 108 could vary in type and/or amount. While two power outlet locations have been discussed, the front trunk 26 could include power outlets in additional locations.

The first surface 54 can be formed as a textured or finished surface configured to resist sliding of items places on the first surface 54. A rubber mat could be attached to or placed on the first surface 54. The first surface 54 could also include or incorporate a wireless charging pad.

Below the shelf 92, the rear wall 72 includes a section including perforated hardboard 110. Various items, such as tools and chargers, are shown mounted to the perforated hardboard 110. The chargers could be connected to a power source of the vehicle 10. As with perforated hardboard 90, the perforated hardboard 110 can be used for the storage of tools and equipment, as examples. Further, the perforated hardboard 110 can be mounted to the rear wall 72 or, alternatively, the rear wall 72 can be integrally formed with equally-spaced holes corresponding to those of perforated hardboard. The perforated hardboard 110 includes equally-spaced apart holes configured to receive standard sized pegs, hooks, or other adapters configured to mount and store various items.

In an embodiment, the first and second panels 30, 32 are manually moveable between the open and closed positions. However, the first and second panels 30, 32 could be opened automatically using a powered assembly P that includes one or more powered actuators, gears, linkages, etc. In this instance, a user could initiate opening and/or closing of the first and second panels 30, 32 by initiating an open or close command on a keyfob, on mobile device of the user, by a button on an exterior of the vehicle 10, and/or by a user interface in the passenger cabin 22. When the first and second panels 30, 32 are powered, the powered actuators can hold the first and second panels 30, 32 in place in the open and closed positions. Alternatively or additionally, the hinges 34, 50 may cooperate with one or more detents and/or releasable latches configured to hold the first and second panels 30, 32 in the open and closed positions. For instance, the edge 66 could include a releasable latch configured to engage a projection from the first surface 38 to hold the first and/or second panels 30, 32 in the closed position.

Figure 5:
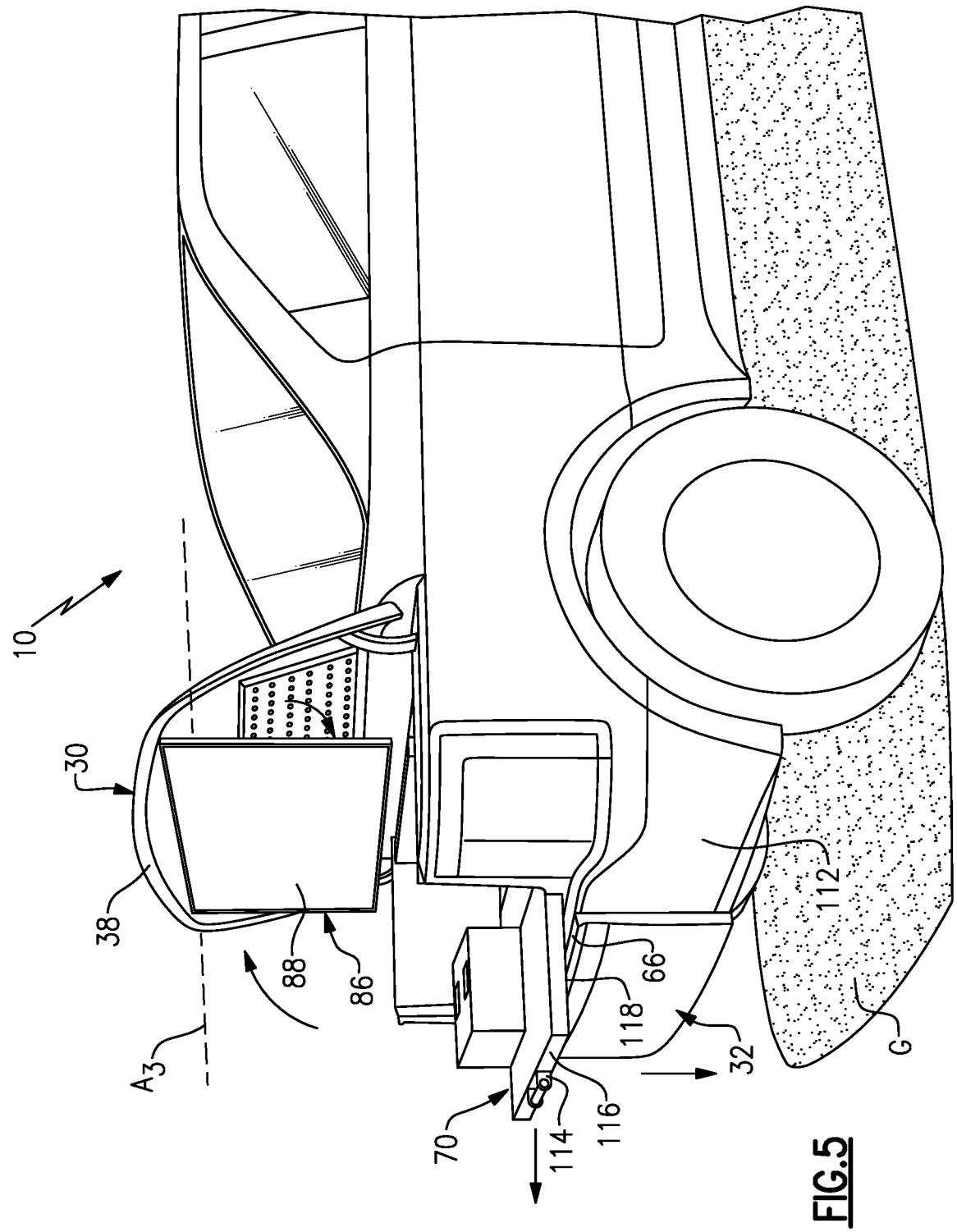
FIG. 5 illustrates another embodiment of a front trunk of the electrified vehicle.

FIG. 5 illustrates another embodiment including a number of alternate design features relative to the exemplary embodiment of FIGS. 1-4. Any one of the alternate design aspects of FIG. 5 can be incorporated into the exemplary embodiment of FIGS. 1-4.

Initially, the shelf 92 is not present in the embodiment of FIG. 5. Further, with respect to the electronic visual display 86, in the embodiment of FIG. 5, the electronic visual display 86 is not rigidly mounted to the first panel 30. In this embodiment, the first panel 30 is rotatable to an open position in which the first surface 38 is oriented at an acute angle relative to the ground surface G. In order to orient the electronic visual display 86, and in particular the screen 88, to be substantially perpendicular to the ground surface G, the electronic visual display 86 is configured to rotate relative to the first surface 38 about an axis $A_3$ adjacent a top of the electronic visual display 86. The axis $A_3$ is parallel to axes $A_1$ and $A_2$ in this example. In an example, when the first panel 30 is open, the first surface 38 is inclined relative to the ground surface G by an angle of between 60-80°, and the electronic visual display 86 is configured to rotate between 10-30° about axis $A_3$. In a specific example, when the first panel 30 is open, the first surface 38 is inclined relative to the ground surface G by an angle of 70°, and the electronic visual display 86 is configured to rotate between 200 about axis $A_3$ such that the screen 88 is substantially perpendicular to the ground surface G.

Another alternate design aspect relates to alternate movement of the second panel 32 and a corresponding option for the floor 70. In FIG. 5, the second panel 32 is configured to move to an open position which is downward, generally in front of the front bumper 112, and slightly forward of the closed position. FIG. 5 illustrates the second panel 32 in the alternative open position. A hinge, linkage, and/or track could guide movement of the second panel 32 to this alternative open position. In the alternative open position, the edge 66 is beneath a floor 70 of the front trunk 26, such that a panel providing the floor 70 can slide forward of the front bumper 112. In this position, the floor 70 may function as a tabletop or work space and could be used as a desk, a picnic table, a tailgating area, etc. The floor 70 includes a handle 114 in a forward edge 116 thereof, which is configured to be grasped by a user to slide the floor 70 to the position of FIG. 5. The edge 66 of the second panel 32 may directly abut a bottom surface 118 of the floor 70 and support the floor 70 from the bottom when the floor 70 is in the position of FIG. 5. The floor 70 may be mounted on a track similar to a drawer slide, and is generally slidable between a first position in which the floor 70 is fully within the front trunk 26 and provides a floor of the front trunk 26, as generally shown in FIG. 2, and a second position, such as that of FIG. 5, in which the floor 70 is at least partially forward of the front bumper 112.

In both embodiments, the various surfaces of the front trunk 26 and panels 30, 32, including the first surface 38, first surface 54, floor 70, rear wall 72, and side walls 74, 76 may be made of a polymeric material. However, other materials, including metallic materials, are also contemplated within the scope of this disclosure.

The various work surfaces discussed above, including the surfaces 54, 84, 100, etc., could include one or more embossings that establish one or more measurement rulers for measuring items when positioned atop the work surface. Each of the work surfaces may include cup holders, storage trays, power outlets, etc. The front trunk 26 could also be fitted with various storage compartments and other features such as speakers for listening to music or other audio during tailgating, work, or other activities, and an interface for controlling the speakers. Any electronics, including power outlets, can be electrically connected to and powered by the battery pack 18.

Further, the vehicle 10 can a controller C (FIG. 1) that is part of an overall vehicle control module, such as a vehicle system controller (VSC), or could alternatively be a stand-alone controller separate from the VSC. The controller C may be programmed with executable instructions for interfacing with and operating the various components of the vehicle 10. The controller additionally includes a processing unit and non-transitory memory for executing the various control strategies and modes of the vehicle 10. As examples, the controller C can selectively direct power to the power outlets 106, 108, activate the electronic visual display 86, charge power tools mounted to the perforated hardboard 110, and/or command the powered assembly P (if present) to open and close the first and second panels 30, 32, among other functions.

The electronic visual display 86 is connectable to various devices and is able to play media as commanded by those devices. For example, the electronic visual display 86 is connectable, by a wired or wireless connection, to an infotainment system of the vehicle 10 or another source, such as the Internet, or a mobile device of user, to play still images/video.

It should be understood that terms such as "about," "substantially," and "generally" are not intended to be boundaryless terms, and should be interpreted consistent with the way one skilled in the art would interpret those terms. Further, directional terms such as "forward," "rearward," "upward," "downward," "vertical," "horizontal," etc., are used with reference to the normal operational orientation of the vehicle and are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:
a front trunk establishing a cargo space;
a first panel moveable between a closed position in which the first panel covers the front trunk and an open position in which the first panel uncovers the front trunk, wherein the first panel includes a first surface facing the cargo space when the first panel is in the closed position;
an electronic visual display mounted to the first surface, wherein the first panel and the electronic visual display are configured such the electronic visual display is substantially perpendicular a ground surface beneath the motor vehicle when the first panel is in the open position, wherein the electronic visual display is one of a television and a computer monitor; and
a mount attached to or integrally formed with the first surface, wherein the mount includes perforated hardboard.

2. The motor vehicle as recited in claim 1, wherein:
the electronic visual display is rigidly attached to the first surface via the mount.

3. The motor vehicle as recited in claim 1, wherein:
the first surface is inclined at an acute angle relative to the ground surface when the first panel is in the open position, and
the electronic visual display is attached to the first surface via the mount such that the electronic visual display is rotatable relative to the first surface to a position in which the electronic visual display is substantially perpendicular to the ground surface.

4. The motor vehicle as recited in claim 1, further comprising:
first and second ledges on opposite sides of the cargo space, wherein the first and second ledges each include a work surface substantially parallel to a floor of the cargo space.

5. The motor vehicle as recited in claim 4, wherein the first and second ledges each include at least one cup holder adjacent the work surface.

6. The motor vehicle as recited in claim 1, further comprising:
a second panel moveable independent of the first panel between a closed position in which the second panel covers the front trunk and an open position in which the second panel uncovers the front trunk.

7. The motor vehicle as recited in claim 6, wherein the second panel is rotatable about an axis adjacent a bottom edge of the second panel.

8. The motor vehicle as recited in claim 7, wherein the second panel includes power outlets in an edge thereof such that the power outlets face a forward direction when the second panel is in the open position.

9. The motor vehicle as recited in claim 8, further comprising:
a floor moveable to a position at least partially forward of a front bumper of the motor vehicle when the second panel is in the open position.

10. The motor vehicle as recited in claim 6, wherein the second panel is configured to slide forward and downward when moving from the closed position to the open position.

11. The motor vehicle as recited in claim 6, wherein the first panel is a hood of the motor vehicle and the second panel is a grille of the motor vehicle.

12. A motor vehicle, comprising:
a front trunk establishing a cargo space;
a first panel moveable between a closed position in which the first panel covers the front trunk and an open position in which the first panel uncovers the front trunk, wherein the first panel includes a first surface facing the cargo space when the first panel is in the closed position;
an electronic visual display mounted to the first surface, wherein the first panel and the electronic visual display are configured such the electronic visual display is substantially perpendicular a ground surface beneath the motor vehicle when the first panel is in the open position; and
a shelf configured to slide between a deployed position and a retracted position, wherein, in a retracted position, a front edge of the shelf is substantially flush with a rear wall adjacent a top of the cargo space, and, in the deployed position, a front edge of the shelf is forward of the rear wall and rearward of a front of the cargo space.

13. The motor vehicle as recited in claim 12, wherein, above the shelf, the rear wall includes a plurality of power outlets.

14. The motor vehicle as recited in claim 12, wherein, below the shelf, the rear wall includes perforated hardboard.

15. A method, comprising:
   moving a first panel to an open position such that an electronic visual display mounted to the first panel is substantially perpendicular to a ground surface, wherein the first panel is configured to selectively cover and uncover a front trunk of a motor vehicle; and
   moving a second panel independent of the first panel, wherein the second panel is configured to selectively cover and uncover the front trunk.

16. The method as recited in claim 15, wherein the electronic visual display is rigidly mounted to an underside of the first panel.

17. The method as recited in claim 15, wherein the electronic visual display is rotatable relative to the first panel.

\* \* \* \* \*